Patented Sept. 20, 1949

2,482,631

UNITED STATES PATENT OFFICE 2,482,631

ETHERS OF POLYALKYLATED CYCLIC SULFONES

Rupert C. Morris, Berkeley, and John L. Van Winkle, San Lorenzo, Calif., assignors to Shell Development Company, San Francisco, Calif., a corporation of Delaware No Drawing. Application April 1, 1946, Serial No. 658,880

4 Claims. (Cl. 260—329)

This invention relates to a novel and particularly useful class of compounds comprising the ethers of polyalkylated cyclic sulfones. More particularly, the invention pertains to polyalkylated sulfolanyl and sulfolenyl ethers. A particularly valuable group of compounds comprises the 2,4-dialkylsulfolanyl and 2,4-dialkylsulfolenyl ethers.

The ethers of the invention contain a five-membered heterocyclic ring consisting of four nuclear carbon atoms and a sulfonyl radical and have at least two alkyl radicals directly attached to one or more of the nuclear carbon atoms, and have at least one of the nuclear carbon atoms directly attached by a single bond to an oxygen atom which is linked directly to a hydrocarbon radical.

The novel polyalkylated sulfolanyl ethers of the invention contain a five-membered heterocyclic ring consisting of four saturated nuclear carbon atoms and a sulfonyl radical having at least two alkyl radicals directly attached to one or more of the nuclear carbon atoms, and have at least one of the nuclear carbon atoms directly attached by a single bond to an oxygen atom which is linked directly to a hydrocarbon radical, the remaining free bonds of the nuclear carbon atoms being directly attached to members of the group consisting of the hydrogen atom and the hydrocarbon radicals. The polyalkylated sulfolanyl ethers may be represented by the formula

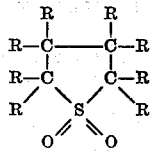

wherein at least one of the R's is a hydrocarbyloxy radical, at least two of the R's are alkyl radicals, and the remaining R's are members of the group consisting of the hydrogen atom and the hydrocarbon radicals. By a hydrocarbyloxy radical is meant the radical represented by the formula —O—R₁, R₁ representing a hydrocarbon radical.

The polyalkylated sulfolenyl ethers of the invention contain a five-membered heterocyclic ring consisting of four nuclear carbon atoms and a sulfonyl radical having a double bond between two vicinal nuclear carbon atoms, and have at least two alkyl groups directly attached to one or more of the nuclear carbon atoms and at least one of the nuclear carbon atoms directly attached by a single bond to an oxygen atom which is linked directly to a hydrocarbon radical. The polyalkylated sulfolenyl ethers may be represented by the formulae

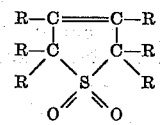

and

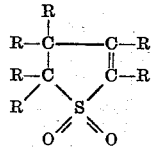

wherein at least one of the R's is a hydrocarbyloxy radical, at least two of the R's are alkyl radicals, and the remaining R's are members of the group consisting of the hydrogen atom and the hydrocarbon radicals.

A valuable group of cyclic sulfone ethers of the invention contain a five-membered heterocyclic ring consisting of four nuclear carbon atoms and a sulfonyl radical having two alkyl radicals directly attached to two different nuclear carbon atoms, preferably in the 2- and 4-positions, and have one of the four nuclear carbon atoms directly attached by a single bond to an oxygen atom which is linked directly to a hydrocarbon radical, the remaining free bonds of the nuclear carbon atoms being directly attached to hydrogen atoms.

The alkyl radicals which are directly attached to the cyclic sulfone nucleus are preferably lower alkyl radicals containing not more than four carbon atoms, i. e. the methyl, ethyl, propyl, isopropyl, n-butyl, sec-butyl and tert-butyl radicals. However, useful compounds are also formed wherein alkyl radicals containing more than four carbon atoms are directly attached to the cyclic sulfone nucleus. Examples of the higher alkyl radicals are amyl, hexyl, isoamyl, 2-methylamyl, heptyl, octyl, stearyl and the like.

The hydrocarbon radicals which are directly attached to the oxygen atom which is linked directly to the cyclic sulfone nucleus are monovalent radicals which may be cyclic, or acyclic, saturated, unsaturated or aromatic, such as the alkyl, alkenyl, aryl, alkaryl, alkenaryl, aralkyl, aralkenyl, cyloalkyl and cycloalkenyl radicals. Suitable hydrocarbon radicals are methyl, ethyl, propyl, isopropyl, butyl, sec-butyl, tert-butyl, amyl, hexyl, cyclohexyl, cyclohexenyl, 3,5,5-trimethyl-2-cyclohexenyl, 3,5,5-trimethyl-3-cyclohexenyl, 3,3,5-trimethyl-cyclohexyl, vinyl, isopropenyl, allyl, methallyl, crotyl, tiglyl, cinnamyl, phenyl, benzyl, cresyl, xylyl, styryl, naphthyl, cyclopentadienyl, propargyl, and the like and their homologues. Valuable compounds are represented when the hydrocarbon radicals which are directly attached to the oxygen atom are of saturated character, i. e. not readily hydrogenatable, such as the alkyl, cycloalkyl, aryl, aralkyl and alkaryl radicals, more preferably the alkyl radicals. Examples of the saturated hydrocarbon radicals include methyl, ethyl, propyl, isopropyl, butyl, isobutyl, sec-butyl, tert-butyl, cyclohexyl, cyclopropyl and 3,3,5-trimethylcyclohexyl.

Polyalkylsulfolanyl ethers having an oxygen atom on the nuclear carbon atom in the 3-position directly attached to a hydrocarbon radical, and having an alkyl group on each of the nuclear carbon atoms in the 2- and 4-positions of the sulfolane ring, possess unexpectedly valuable properties which make them of particular use in various industrial applications. An example of a particularly valuable alkyl 2,4-dialkylsulfolanyl ether is methyl 2,4-dimethyl-3-sulfolanyl ether.

The numbering system of the sulfolane or sulfolene ring is indicated below:

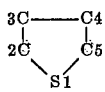

This is in accordance with the accepted system of numbering as exemplified by the compounds of this type of ring structure given on page 44 of Patterson and Capell, The Ring Index, Reinhold Publishing Corp., New York, 1940; Am. Chem. Soc. Monograph No. 84. The system may be exemplified by the compound having the structure

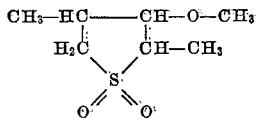

which is termed methyl 2,4-dimethyl-3-sulfolanyl ether. The compound having the structure

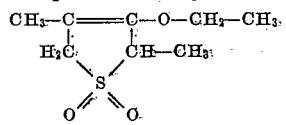

is termed ethyl 2,4-dimethyl-3-sulfolen-3-yl ether.

Ethers of the type of methyl 3-sulfolanyl ether and methyl 4-methyl-3-sulfolen-3-yl ether are disclosed in the prior art. In all of these compounds, the sulfolane or sulfolene nucleus has no more than one alkyl radical directly attached thereto. Novel compounds have now been prepared wherein the sulfolane or sulfolene nucleus has at least two alkyl radicals directly attached to one or more nuclear carbon atoms. Surprisingly, it has been found that the polyalkylated cyclic sulfone ethers of the invention, and particularly the hydrocarbyl 2,4-dialkylsulfolanyl and 2,4-dialkylsulfolenyl ethers, possess inherent properties which are markedly superior to those of the cyclic sulfone ethers containing no more than one alkyl substituent on the heterocyclic nucleus. These properties could not be foreseen, and they are of such a nature as to make the compounds of the invention particularly useful in various industrial applications.

The polyalkylated sulfolanyl and sulfolenyl ethers of the invention may be prepared by any suitable method. A particularly convenient method for the preparation of the polyalkylsulfolanyl ethers comprises reacting a polyalkyl-sulfolene such as a 2,4-dialkyl-3-sulfolene with an alcohol or phenol, generally in the presence of a basic-reacting substance, preferably a strong base such as an alkali metal hydroxide or an alkali metal alcoholate. Examples of the most suitable bases are caustics such as sodium hydroxide and potassium hydroxide. The hydroxy compound which is to be reacted with the polyalkylsulfolene may be represented by the formula $R_1$—OH wherein $R_1$ is a hydrocarbon radical. Suitable hydroxy compounds are the aliphatic alcohols, the cycloaliphatic alcohols, the arylalkyl alcohols and the phenols such as methyl alcohol, ethyl alcohol, isopropanol, butanol-1, allyl alcohol, methallyl alcohol, crotyl alcohol, cinnamyl alcohol, 3,5,5-trimethylcyclohexen-2-ol, 3,3,5-trimethylcyclohexanol, cyclohexanol, phenol, phenyl carbinol, methyl phenyl carbinol, cresol, xylenol, and the like and their homologues. Glycols, glycerols and other polyhydric alcohols may also be used.

When a polyalkyl-2-sulfolene having the double bond between two nuclear carbon atoms one of which is directly attached to the sulfonyl radical, is reacted with the alcohol or phenol, a polyalkyl-3-sulfolanyl ether is produced. When the alcohol or phenol is reacted with a polyalkyl-3-sulfolene, i. e. a sulfolene having the double bond between two nuclear carbon atoms each of which is once removed from the sulfonyl radical, a hydrocarbyl polyalkyl-3-sulfolanyl ether is formed; for example ethyl alcohol reacted with 2,4-dimethyl-3-sulfolene produces ethyl 2,4-dimethyl-4-sulfolanyl ether.

The prior art as shown in U. S. Patent 2,219,006 shows the reaction of 3-sulfolene with an alcohol at room temperature, i. e. at about 20° C. to 25° C. However, it has been discovered that ethers of polyalkylsulfolenes can not be prepared by reacting polyalkylsulfolenes with alcohols under the conditions taught by this patent. When the reaction is attempted under the conditions shown by the patent, it was found that the reactants are recovered substantially unchanged i. e. no reaction had occurred. The reaction between the organic hydroxy compound and the polyalkylsulfolene is preferably carried out at a temperature of at least about 60° C. in order to obtain substantial amounts of the desired ether. However, it is desirable that the temperature be kept below that temperature at which appreciable decomposition of the reactants and/or products occurs.

The polyalkylsulfolene which is to be reacted with the organic hydroxy compound is prepared by reacting the corresponding conjugated diene of at least six carbon atoms with sulfur dioxide. For example, 3,4-dimethyl-3-sulfolene is prepared by reacting sulfur dioxide and 2,3-dimethylbutadiene, and 2,4-dimethyl-3-sulfolene is formed by the reaction of sulfur dioxide and 4-methylpentadiene or 2-methylpentadiene.

A hydrocarbyl polyalkylsulfolenyl ether may be produced by reacting sulfur dioxide with the appropriate conjugated diolefinic compound having one of the unsaturated carbon atoms linked by an oxygen atom to a hydrocarbon radical. This reaction may be represented by the general equation

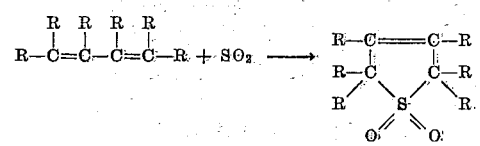

wherein at least one of the R's is a hydrocarbyloxy radical (i. e. the radical —OR₁, R₁ representing a hydrocarbon radical), at least two of the R's are alkyl radicals, while the remaining R's are members of the group consisting of the hydrogen atom and the hydrocarbon radicals. A hydrocarbyl polyalkylsulfolenyl ether may also be prepared by reacting the corresponding polyalkylhalosulfolene with an alcohol or phenol in the presence of a metal such as sodium; for example propyl 2,4-dimethyl-3-sulfolen-3-yl ether is prepared by reacting propanol and 2,4-dimethyl-3-chloro-3-sulfolene in the presence of sodium.

An ether of a polyalkylsulfolane such as a 2,4-dialkylsulfolane, having more than one hydrocarbyloxy radical directly attached to one or more of the nuclear carbon atoms of the sulfolane nucleus, may be prepared by reacting the corresponding hydrocarbyl polyalkylsulfolenyl ether with the desired alcohol or phenol.

The novel hydrocarbyl polyalkylsulfolanyl and polyalkylsulfolenyl ethers of the invention find utility in a large variety of industries. For example, the ethers may be used as insecticides, fungicides and parasiticides or as ingredients of insecticidal, fungicidal and parasiticidal compositions, and as ingredients for use in the manufacture of varnishes, polishes, and the like. Also, these novel compounds may be employed in the preparation of natural or synthetic rubbers, resins, plastics, etc., and they are of value in the resin and lacquer industry as solvents and plasticizers for the manufacture of dopes, fabric coatings, sprays and moulding compositions. The hydrocarbyl ethers of polyalkylated cyclic sulfones are of use as antioxidants, pourpoint depressants, extracting agents, ingredients in cosmetics, as base materials and fixing agents in the preparation of perfumes, as softening agents for the leather industry and as selective solvents in extractive distillation processes. Moreover, the hydrocarbyl polyalkylsulfolanyl and polyalkylsulfolenyl ethers may be further reacted, e. g. sulfurized, sulfated, or the like, to produce valuable substances to be used as addition agents in lubricating oils, greases, and as detergents, as well as for a variety of other purposes.

The alkenyl polyalkylsulfolanyl ethers and more particularly the beta,gamma-alkenyl 2,4-dialkylsulfolanyl ethers such as allyl 2,4-dimethylsulfolanyl ether, are of outstanding value as plasticizers and softeners for treating synthetic rubbers to increase their tackiness and enhance their value especially for use in the manufacture of tires for the automotive, aviation and the like industries.

The following examples serve to illustrative the invention.

*Example I*

Approximately 292 parts by weight of 2,4-dimethyl-3-sulfolene were placed in a pressure bottle along with about 256 parts by weight of methyl alcohol and about 10 parts by weight of approximately 96% sodium hydroxide. The mixture was heated in a water bath at about 60° C. for several hours, and the product was filtered and distilled. There was obtained about 202 parts by weight of product boiling at 142° C. to 148° C. at 4 to 5 mm. The methyl 2,4-dimethyl-4-sulfolanyl ether recovered has the following physical characteristics:

d 20/4 _____ 1.17
n 20/D _____ 1.4896

*Example II*

A mixture of about 464 parts by weight of allyl alcohol, about 292 parts by weight of 2,4-dimethyl-3-sulfolene and about 10 parts by weight of approximately 96% sodium hydroxide is reacted in a pressure bottle in a water bath at about 60° C. to about 65° C. to produce a substantial yield of allyl 2,4-dimethyl-4-sulfolanyl ether.

*Example III*

Following the procedure described in Example I, n-butyl alcohol and 2,4-diethyl-3-sulfolene are reacted in the presence of sodium hydroxide to produce n-butyl 2,4-diethyl-4-sulfolanyl ether.

*Example IV*

When isopropyl alcohol and 2,4-dimethyl-3-sulfolene are reacted according to the process of Example II, isopropyl 2,4-dimethyl-4-sulfolanyl ether is formed.

*Example V*

Phenol and 2,4-dipropyl-3-sulfolene are reacted in the presence of potassium hydroxide according to the procedure described in Example II to obtain phenyl 2,4-dipropyl-4-sulfolanyl sulfide.

*Example VI*

3,5,5 - trimethyl - 2 - cyclohexenol and 2,4-dimethyl-3-sulfolene are reacted in the presence of potassium hydroxide according to the procedure described in Example I to produce 3,5,5-trimethyl - 2 - cyclohexenyl 2,4 - dimethyl - 4-sulfolanyl ether.

*Example VII*

3,3,5-trimethylcyclohexyl carbinol may be reacted with 2,4-diethyl-3-sulfolene in accordance with the procedure described in Example I to form 3,3,5 - trimethylcyclohexylcarbinyl 2,4 - diethyl-4-sulfolanyl ether.

*Example VIII*

Allyl alcohol is added to a solution of about 1.2 grams of sodium in approximately 25 cc. of absolute alcohol, and to this mixture there is added a concentrated solution of about 9.0 grams of 2,4-dimethyl-3-chloro-3-sulfolene in absolute alcohol. After boiling the mixture for a few minutes, sodium chloride is filtered off, and allyl 2,4-dimethyl-3-sulfolen-3-yl ether is recovered.

*Example IX*

Propyl 4-methyl-2,4-pentadien-3-yl ether is treated with approximately an equimolar amount of sulfur dioxide in the presence of pyrogallol at a temperature between about 95° C. and about 105° C. to obtain propyl 2,4-dimethyl-3-sulfolen-3-yl ether.

According to the general procedures outlined above, the following novel compounds are also prepared: ethyl 2,4-diethyl-2-sulfolen-3-yl ether, methyl 2-methyl,4-ethyl-3-sulfolanyl ether, propyl 2-ethyl, 4-propyl-3-sulfolanyl ether, ethyl 2-methyl, 4-butyl-2-sulfolen-3-yl ether, benzyl 2,4-diisopropyl-4-sulfolanyl ether, xylyl 2,4-dibutyl-3-sulfolanyl ether, sec-butyl 2-methyl, 4-ethyl-3-sulfolen-3-yl ether, methallyl 2,4-dimethyl-3-sulfolanyl ether, crotyl 2,4-dimethyl-4-sulfolanyl ether, tiglyl 2,4-diethyl-4-sulfolanyl ether, cinnamyl 2,4-dimethyl-3-sulfolanyl ether, allyl 2,4-diethyl-4-sulfolanyl ether, allyl 2,4-dimethyl-3-sulfolen-3-yl ether, methylisopropenylcarbinyl 2,4-dimethyl-3-sulfolen-3-yl ether, vinyl 2,4-dimethyl-2-sulfolen-3-yl ether and allyl 2,4-dimethyl-2-sulfolen-4-yl ether. Other hydrocarbyl ethers of polyalkylated cyclic sulfones which may be prepared are methyl 2,3,4-trimethyl-3-sulfolanyl ether, isopropyl 2,4,5-triethyl-3-sulfolanyl ether, butyl 2,4-dimethyl, 3-ethyl-4-sulfolanyl ether, allyl 2,2,4-trimethyl-3-sulfolanyl ether, vinyl 2,5 - dimethyl - 3 - sulfolanyl ether, 3,3,5 - trimethylcyclohexyl 3,5 - dipropyl-4-sulfolanyl ether, cresyl 2,5-dibutyl-3-sulfolanyl ether, 3,5,5-trimethyl-2-cyclohexenyl 2,4,5 - trimethyl-4-sulfolanyl ether, methyl 2,3,4,5-tetramethyl-3-sulfolanyl ether, allyl 2,4,5-trimethyl-2-sulfolen-3-yl ether, methallyl 2,5-dimethyl-2-sulfolen-4-yl ether and benzyl 2,3-diethyl-4-sulfolanyl ether.

This application is a continuation-in-part of copending application Serial Number 512,050, filed November 27, 1943.

We claim as our invention:

1. A compound having the structural formula

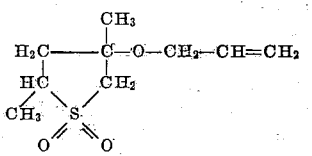

2. A compound having the structural formula

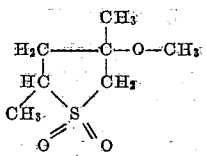

3. A compound having the structural formula

CH₃—C══C—O—CH₂—CH=CH₂
  |        |
 H₂C      CH
   \    /   \
    S      CH₃
   //\\
  O   O

4. A compound containing a 5-membered heterocyclic nucleus consisting of 4 nuclear carbon atoms and the sulfur atom of a sulfonyl radical wherein each of the nuclear carbon atoms in the 2- and 4-positions is directly attached to an alkyl radical containing from 1 to 4 carbon atoms and wherein one of the nuclear carbon atoms is directly attached to an oxygen atom which, in turn, is linked directly to a hydrocarbon radical selected from the group consisting of the alkyl radicals and the beta,gamma-alkenyl radicals, the remaining free bonds of the nuclear carbon atoms being linked directly to hydrogen atoms.

RUPERT C. MORRIS.
JOHN L. VAN WINKLE.

REFERENCES CITED

The following references are of record in the file of this patent:

UNITED STATES PATENTS

| Number | Name | Date |
| --- | --- | --- |
| 2,189,367 | Muth | Feb. 6, 1940 |
| 2,291,798 | Delfs | Aug. 4, 1942 |
| 2,393,925 | Morris et al. | Jan. 29, 1946 |